(12) United States Patent
Evans

(10) Patent No.: US 10,969,605 B1
(45) Date of Patent: Apr. 6, 2021

(54) VIRTUAL REFLECTIVE 3D VOLUMETRIC DISPLAY DEVICE AND METHOD FOR CREATING VIRTUAL REFLECTIVE 3D VOLUMETRIC IMAGERY

(71) Applicant: Wayne Oliver Evans, Los Angeles, CA (US)

(72) Inventor: Wayne Oliver Evans, Los Angeles, CA (US)

( * ) Notice: Subject to any disclaimer, the term of this patent is extended or adjusted under 35 U.S.C. 154(b) by 270 days.

(21) Appl. No.: 16/200,903

(22) Filed: Nov. 27, 2018

(51) Int. Cl.
*G02B 30/54* (2020.01)

(52) U.S. Cl.
CPC .................................... *G02B 30/54* (2020.01)

(58) Field of Classification Search
None
See application file for complete search history.

(56) References Cited

U.S. PATENT DOCUMENTS

| | | | | | |
|---|---|---|---|---|---|
| 1,492,324 | A | * | 4/1924 | Howard | G09F 19/10 312/114 |
| 1,692,943 | A | * | 11/1928 | Lelyveld | A43D 1/025 359/872 |
| 1,992,872 | A | * | 2/1935 | Mahler | G02B 30/35 359/472 |
| 2,334,483 | A | * | 11/1943 | Dennis | G02B 30/37 359/467 |
| 2,712,773 | A | * | 7/1955 | Merrick | G02B 30/34 359/466 |
| 2,951,417 | A | * | 9/1960 | Reeder | G02B 30/35 359/471 |
| 3,512,863 | A | * | 5/1970 | Matranga | G02B 30/35 359/471 |
| 4,500,088 | A | * | 2/1985 | Lasky | G09F 19/16 359/449 |
| 5,194,955 | A | * | 3/1993 | Yoneta | H04N 7/144 348/14.01 |
| D391,282 | S | * | 2/1998 | Evers | 359/474 |
| 5,721,586 | A | * | 2/1998 | Shimamura | H04N 5/2222 348/375 |
| 5,959,791 | A | * | 9/1999 | Bagnato, III | G02B 7/182 248/466 |
| 6,104,424 | A | * | 8/2000 | McNelley | G02B 30/56 348/14.16 |
| 6,464,358 | B1 | * | 10/2002 | Shirakura | G03B 21/00 353/119 |
| 6,542,297 | B1 | * | 4/2003 | Lee | G02B 7/1824 359/466 |

(Continued)

*Primary Examiner* — Jennifer D. Carruth
(74) *Attorney, Agent, or Firm* — Plager Schack LLP; Mark H. Plager; Stephen Hallberg

(57) ABSTRACT

A virtual reflective 3D volumetric display device and a method for creating virtual reflective 3D volumetric imagery are disclosed to present virtual 3D volumetric object imagery without head tracking or tracking a person's view or eye positions, and which neither presents refractive images nor requires VR goggles or headsets, but instead presents pure volumetric object imagery appearing in the three-dimensional shapes of objects, which can be simultaneously viewed by multiple viewers who each view the shapes of the virtual 3D volumetric object imagery from their own point of view. The three-dimension volumetric reflection display adapter and standalone screen delivers the appearance of volumetric effect with ease.

6 Claims, 5 Drawing Sheets

(56) References Cited

U.S. PATENT DOCUMENTS

| | | | | |
|---|---|---|---|---|
| 7,097,313 | B2 * | 8/2006 | Dar-Tson | G02B 7/1824 |
| | | | | 359/402 |
| 8,902,355 | B2 * | 12/2014 | Dudkowski | H04N 5/2222 |
| | | | | 348/373 |
| 9,116,357 | B2 * | 8/2015 | Chen | G02B 30/24 |
| 9,749,611 | B2 * | 8/2017 | Park | H04N 13/322 |

* cited by examiner

US 10,969,605 B1

VIRTUAL REFLECTIVE 3D VOLUMETRIC DISPLAY DEVICE AND METHOD FOR CREATING VIRTUAL REFLECTIVE 3D VOLUMETRIC IMAGERY

BACKGROUND

Embodiments of the invention described in this specification relate to a virtual reflective three-dimension ("3D") volumetric display device and method for creating.

Only a few hologram-display-creators out of many actually deliver whats promised. Those which deliver on their promises are typically very expensive. While some people will use hologram displays, there are many other people who will not but who still wish to view or present volumetric 3D imagery.

One of the existing alternatives is to use a 3D display. However, existing 3D displays require viewers to wear 3D glasses.

Another alternative is to use virtual reality (VR) devices or systems. However, in the same way that the existing 3D displays require viewers to use 3D glasses, the existing VR devices and systems require viewers to wear VR goggles or cumbersome VR headsets.

Therefore, what is needed is a way to present virtual 3D volumetric object imagery without head tracking or tracking a person's view or eye positions, and which neither presents refractive images nor requires VR goggles or headsets.

BRIEF DESCRIPTION

A novel virtual reflective 3D volumetric display device and a novel method for creating virtual reflective 3D volumetric imagery are disclosed to present virtual 3D volumetric object imagery without head tracking or tracking a person's view or eye positions, and which neither presents refractive images nor requires VR goggles or headsets, but instead presents pure volumetric object imagery appearing in the three-dimensional shapes of objects, which can be simultaneously viewed by multiple viewers who each view the shapes of the virtual 3D volumetric object imagery from their own point of view.

In some embodiments, the virtual reflective 3D volumetric display device includes a standalone screen. In some embodiments, the virtual reflective 3D volumetric display device works as an adapter to a device with a flat screen. In some embodiments, the virtual reflective 3D volumetric display device includes a flat reflective surface, a motor that oscillates the flat reflective surface, an optical encoder, and an internal controller. In some embodiments, the motor comprises one of a stepper motor and an electro-magnetic motor.

In some embodiments, the method for creating virtual reflective 3D volumetric imagery comprises importing a 3D object into a slicer software application, using the slicer software application to create a plurality of sequential 2D cross-section bitmap images from the 3D object, transmitting the plurality of sequential 2D cross-section bitmap images to a virtual reflective 3D volumetric display device, synchronizing the plurality of sequential 2D cross-section bitmap images with an oscillating reflected surface of the virtual reflective 3D volumetric display device, and visually outputting a virtual 3D volumetric image of the 3D object while a motor and an optical encoder maintains synchronization of the oscillating reflected surface with the corresponding 2D cross-section bitmap images. In some embodiments, the plurality of sequential 2D cross-section bitmap images from the 3D object comprise at least one hundred sequential 2D cross-section bitmap images.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
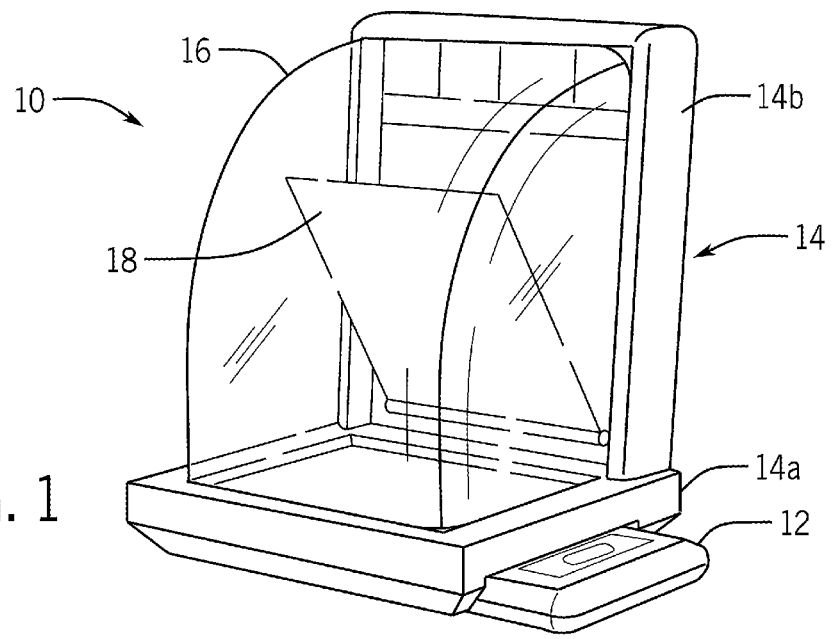
FIG. 1 conceptually illustrates a perspective view of a virtual reflective 3D volumetric display device in some embodiments.

Some embodiments of the invention include a novel virtual reflective 3D volumetric display device and a novel method for creating virtual reflective 3D volumetric imagery to present virtual 3D volumetric object imagery without head tracking or tracking a person's view or eye positions, and which neither presents refractive images nor requires VR goggles or headsets, but instead presents pure volumetric object imagery appearing in the three-dimensional shapes of objects, which can be simultaneously viewed by multiple viewers who each view the shapes of the virtual 3D volumetric object imagery from their own point of view.

In some embodiments, the virtual reflective 3D volumetric display device includes a standalone screen. In some embodiments, the virtual reflective 3D volumetric display device works as an adapter to a device with a flat screen. In some embodiments, the virtual reflective 3D volumetric display device includes a flat reflective surface, a motor that oscillates the flat reflective surface, an optical encoder, and an internal controller. In some embodiments, the motor comprises one of a stepper motor and an electro-magnetic motor.

In some embodiments, the method for creating virtual reflective 3D volumetric imagery comprises importing a 3D object into a slicer software application, using the slicer software application to create a plurality of sequential 2D cross-section bitmap images from the 3D object, transmitting the plurality of sequential 2D cross-section bitmap images to a virtual reflective 3D volumetric display device, synchronizing the plurality of sequential 2D cross-section bitmap images with an oscillating reflected surface of the virtual reflective 3D volumetric display device, and visually outputting a virtual 3D volumetric image of the 3D object while a motor and an optical encoder maintains synchronization of the oscillating reflected surface with the corresponding 2D cross-section bitmap images. In some embodiments, the plurality of sequential 2D cross-section bitmap images from the 3D object comprise at least one hundred sequential 2D cross-section bitmap images.

Embodiments of the virtual reflective 3D volumetric display device described in this specification solve many of the problems noted above by producing viewable 3D volumetric scenes without any physical attachment to viewer. A person using the virtual reflective 3D volumetric display device can move around to change his or her viewing angle to see different views/sides of the 3D-appearing object. For example, a person can run the oscillation multiple times and view from different angles each time to see around the object (up to perhaps 180 degrees, vertically (up and down), horizontally (left to right), and diagonally), or several people can view from different angular positions and see the 3D-appearing object from their own viewpoint. No 3D glasses or VR goggles are required to use the virtual reflective 3D volumetric display device. Furthermore, the virtual reflective 3D volumetric display device does not track a person's view or eye position because the virtual reflective 3D volumetric display device does not perform any head tracking at all. The virtual reflective 3D volumetric display device does not provide refractive images either; just pure volumetric shapes, so you can have multiple viewers because there's no tracking the viewer's eyes or viewpoint.

Embodiments of the virtual reflective 3D volumetric display device described in this specification differ from and improve upon currently existing options. In particular, most hologram displays are flat or gimmicky, unclear results, product never delivers what they say its suppose to. In contrast, the virtual reflective 3D volumetric display device described in this specification is cost effective, simple to deploy and use, and is highly effective at producing the appearance of spatial volume, delivering the volumetric effect with ease.

For purposes of the inventive embodiments described in this specification, a lexicography is included here to define some terms and terminology used throughout the description. Specifically, the phrase "persistence of vision" refers to a human brain capacity to automatically piece together and maintain multiple sequentially viewed partial images of a single object as a coherent whole image of the single object. For example, before televisions supported higher definition resolutions, interlaced scanning was routinely used by televisions to display standard definition television programming.

As defined in this specification, a volumetric reflective 3D display refers to a voluminous appearing 3D object as created by reflection of flat two-dimensional (2D) display of cross-sectional parts of the object. For example, a volumetric reflective 3D display of an object can be created by a ninety degree (90°) reflection from a flat 2D display, such as any one of several existing flat screens, projectors, or other displays including, without limitation, LCD, LCOS, OLED, MICRO-LED, DLP, film projectors, laser (disc) projectors, and CTR displays.

I. Virtual Reflective 3D Volumetric Display Device

The virtual reflective 3D volumetric display device of the present disclosure may be comprised of the following elements. This list of possible constituent elements is intended to be exemplary only and it is not intended that this list be used to limit the virtual reflective 3D volumetric display device of the present application to just these elements. Persons having ordinary skill in the art relevant to the present disclosure may understand there to be equivalent elements that may be substituted within the present disclosure without changing the essential function or operation of the virtual reflective 3D volumetric display device.

1. Reflective flat surface: transparent/mirror
2. LCD display/micro LED display
3. 3D slicer software
4. 3D scanner
5. Motor (stepper, electro-magnetic, etc.)
6. Optical encoder
7. Micro controller
8. Transparent cover The various elements of the virtual reflective 3D volumetric display device of the present disclosure may be related in the following exemplary fashion. It is not intended to limit the scope or nature of the relationships between the various elements and the following examples are presented as illustrative examples only. The reflective flat surface mirror (#1) oscillates 45 degrees to the LCD screen (#2). The mirror oscillation is synchronized with the sequence 2D sliced image displayed by the flat LCD screen or via projection image. The motor (#5), such as stepper motor, and Optical Encoder (#6) Ensure that each corresponding 2D slice is displayed at the correct time, position or and angle. Allowing the reflection in mirror (#1) to draw out a complete Volumetric shape from cross-section sliced. The mirror/reflective surface oscillates at a minimum speed to allow the viewer to see entire 3D scene or object. The mirror (#1) oscillates at forty-five degrees (45°), while the reflections in mirror oscillates at ninety degrees (90°). A one to two relationship between mirror and mirror's reflection.

The virtual reflective 3D volumetric display device of the present disclosure generally works as a stand-alone device or an adapter device that is applied to another type of electronic device capable of display images. Examples of devices which can be adapted by the virtual reflective 3D volumetric display device include, without limitation, any flat display whether be from LCD, OLED, MICRO LED, front or rear projection via digital or film.

By way of example, FIG. 1 conceptually illustrates a perspective view of a virtual reflective 3D volumetric display device 10. As shown in this figure, the virtual reflective 3D volumetric display device 10 works as an adapter of a digital device 12 (that has a display, such as a flat screen), and includes a housing 14, a transparent cover 16, and an oscillating surface 18. The housing 14 is made from two main housing components, including a base 14a of the housing 14 and a vertical portion 14b of the housing 14.

The way in which the virtual reflective 3D volumetric display device functions is primarily with the oscillating reflecting surface and the flat display in sync with one another. As long as those two conditions are physically met, a volumetric image can be drawn in the reflection of oscillating surface. The flat display can be LCD, OLED, LCOS, MICRO-LED, FRONT OR REAR from LED, DMD or FILM PROJECTOR. The forty-five degrees (45°) oscillating reflective surface can be a mirror, glass, Plexiglas, or any flat reflect surface that is opaque, translucent, or transparent. Having the oscillating surface closer to the edge of the base of the flat display will ensure an accurate clean ninety degrees (90°) sweep in the reflection, as this is where the pivot point is for both reflection and display. If the display is further away from the pivot point and oscillating surface, it does not work as well, because the viewing angle becomes narrower, resulting in less parallax effect and more of a flat look instead of a true volumetric scene. Furthermore, when the display is not close to the pivot point, there is a radial space gap and a narrower ring band for objects to be drawn within. Using a bigger display that starts at the pivot point and outwards is preferred in at least some embodiments. When the display area is bigger than the oscillating surface, the observer is provided more viewing area and also hidden areas inside reflection thus simulate a real holographic window experience. This will cause the viewer to lean left or right to see hidden areas in the reflected scene.

Figure 2:
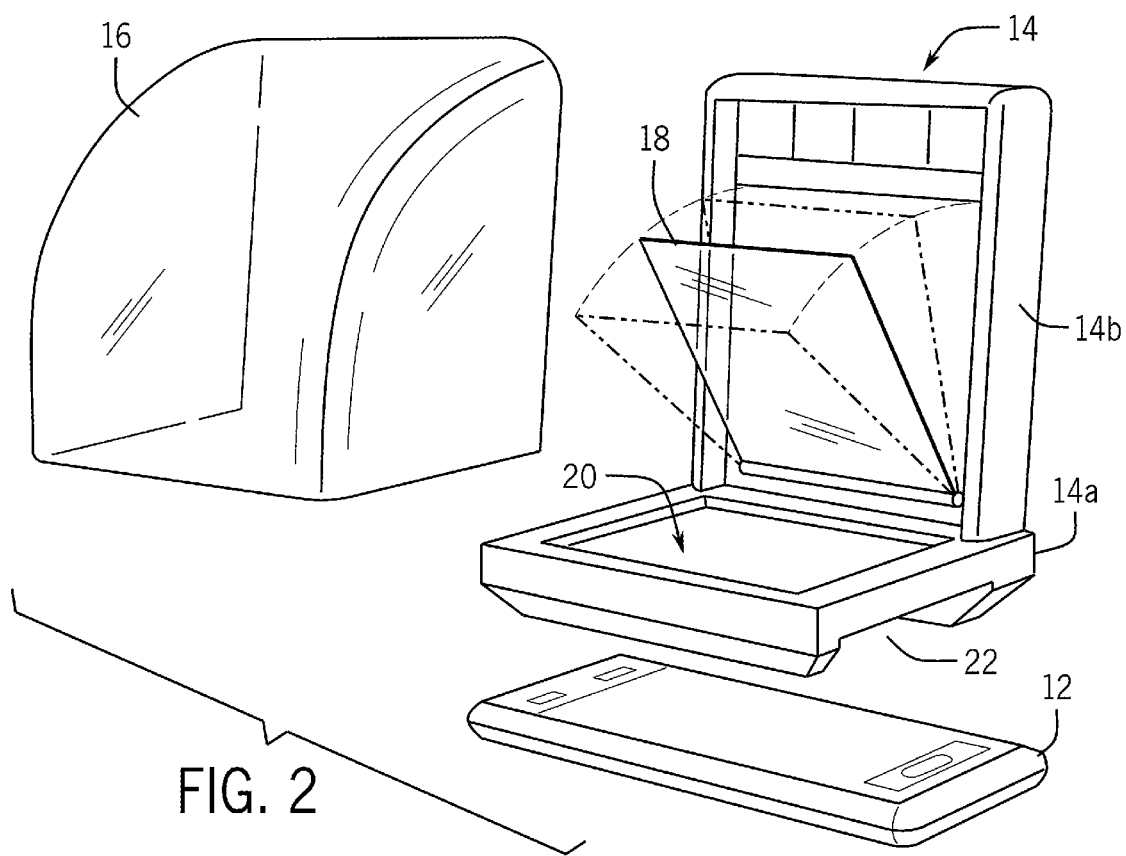
FIG. 2 conceptually illustrates an exploded view of a virtual reflective 3D volumetric display device in some embodiments.

Now turning to another view, FIG. 2 conceptually illustrates an exploded view of the virtual reflective 3D volumetric display device 10 with the transparent cover 16 and the digital device separated from the housing 14 of the virtual reflective 3D volumetric display device 10. As shown in this figure, the virtual reflective 3D volumetric display device 10 further includes a 2D image display opening 20 and a digital device opening 22. With the digital device 12 separated from the base 14a of the housing 14, the digital device opening 22 of the base 14a is revealed. The digital device opening 22 of the base 14a allows the digital device 12 to be aligned precisely for the oscillating surface 18 to reflect the image displayed on the flat screen of the digital device 12. With the transparent cover 16 separated from the housing 14, the 2D image display opening 20 is clearly revealed and it is easy to see that the oscillating surface 18 moves a number of angular degrees while oscillating. However, it is noted that the separation of the transparent cover 16 makes no difference in the oscillating action of the surface 18, because the oscillating surface 18 moves a number of angular degrees while oscillating with or without the transparent cover 16 in place. In some embodiments, the oscillating surface 18 moves forty-five degrees (45°) to create a ninety degree (90°) reflection of a 2D object image displayed on the flat screen of the digital device 12 when the flat screen is properly aligned in the digital device opening 22 to display the 2D object image through the 2D image display opening 20.

The virtual reflective 3D volumetric display device of the present disclosure is a volumetric display device. Whether built to function as an adapter with any flat-screen display or to function with a standalone flat-screen display, the virtual reflective 3D volumetric display device synchronizes motorized movement of the oscillating surface 18 with the sequence of 2D slice images displayed on the flat-screen display (i.e., visually output on the screen).

Figure 3:
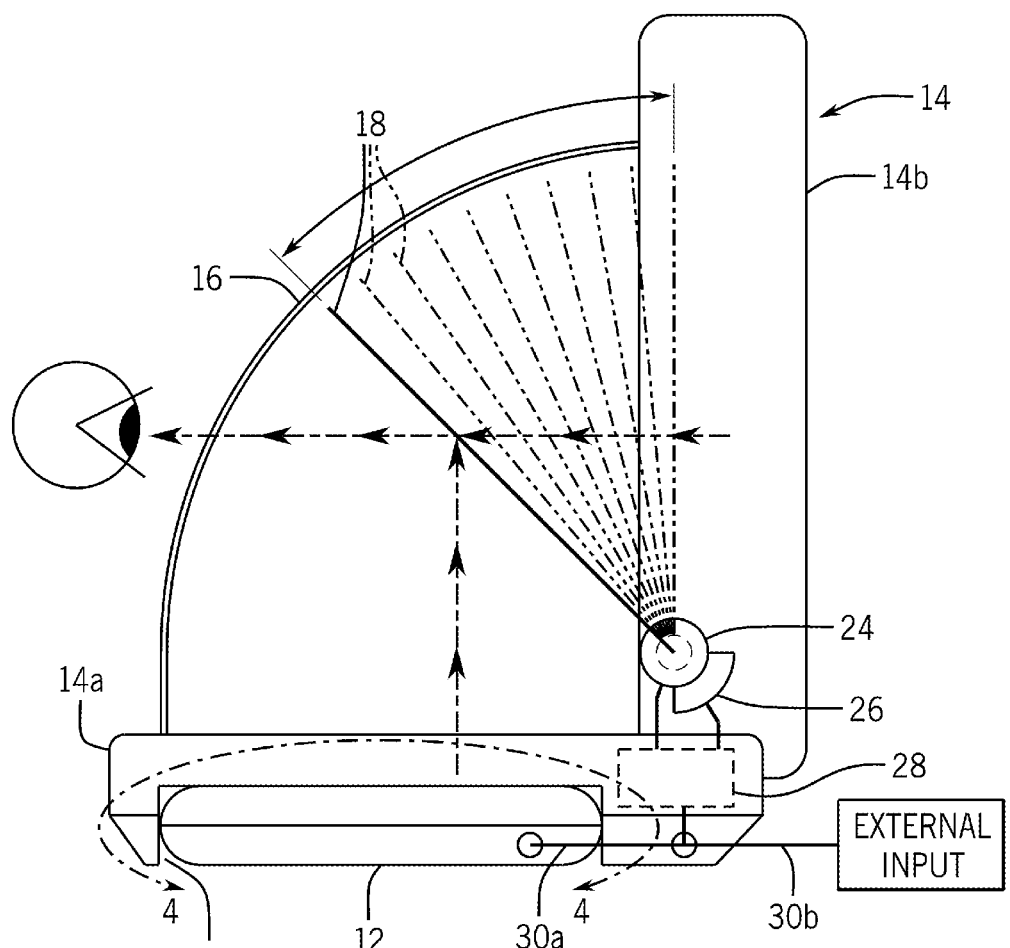
FIG. 3 conceptually illustrates a side elevation view of a virtual reflective 3D volumetric display device in some embodiments.

By way of example, FIG. 3 conceptually illustrates a side elevation view of the virtual reflective 3D volumetric display device 10. As shown in this figure, the virtual reflective 3D volumetric display device 10 is functioning as an adapter with the digital device 12 aligned within the digital device opening 22 of the base 14a of the housing 14. The transparent cover 16 is in place and the oscillating surface 18 is shown moving along the angular path (e.g.) 45° all the way up to the vertical portion 14b of the housing 14. Also shown in this figure, the virtual reflective 3D volumetric display device 10 includes additional components, namely, a motor 24, an optical encoder 26, an internal controller 28, and a connection 30a between the digital device 12 and the internal controller 28. In some embodiments, the connection 30a is a USB connection. In some embodiments, the USB connection comprises a mini-USB connection and cord. In some embodiments, the virtual reflective 3D volumetric display device 10 includes an alternative connection 30b between an external input and the internal controller 28. In some embodiments, the external input is one of a standalone screen, a tablet computing device, and a projector-based display. In some embodiments, the external input comprises one of an LCD screen, an LCOS screen, an OLED screen, a MICRO-LED screen, a DLP screen or projector, a film projector, a laser (disc) projector, and a CTR display monitor. In some embodiments, the external input is connected via one of a USB connection, a mini-USB connection, a VGA connection, a DVI connection, and an HDMI connection.

To generate realistic volumetric 3D appearing objects, the display of image slices on the flat-screen display and movement of the oscillating surface are synchronized. To ensure accurate synchronization, the virtual reflective 3D volumetric display device of some embodiments calculates (by way of the internal controller 28) an incremental angular distance over which to move the oscillating surface 18 for each 2D image to be displayed and sets a rate of movement over the calculated incremental angular distance based on a display time during which each 2D image will be visually output on the flat-screen display. Movement of the oscillating surface 18 over incremental angular distances is shown by dashed lines in FIG. 3. The movement over the calculated incremental angular distance is actuated by the motor 24 as directed by the optical encoder 26. The internal controller 28 communicates with digital device 12 to determine the number of 2D slice images that will be displayed in sequence, and the time over which the sequence of 2D slice images will be visually output onto the screen of the digital device 12. Using this information, the internal controller 28 calculates the incremental angular distance and sets the rate of movement of the oscillating surface 18. For example, when the total angular distance of the oscillating surface is forty-five degrees (45°) and the number of 2D images in the sequence of 2D slice images is one hundred (100), which are displayed in sequence such that all 100 images are displayed in one second of time, the internal controller 28 of the virtual reflective 3D volumetric display device calculates an incremental angular distance over which to move the oscillating surface 18 during a particular time duration T (one second/100 images) for which each 2D image is displayed on the flat-screen display. The virtual reflective 3D volumetric display device can express this calculation based on the formula: forty-five degrees (45°)/100=0.45° of incremental angular distance to move the oscillating surface for $\frac{1}{100}^{th}$ of one second of time. Thus, by using a forty-five degrees (45°) oscillating flat reflective surface 18, the virtual reflective 3D volumetric display device will "draw out" each slice as a reflected view of the corresponding 2D slice image, thereby providing the illusion to an observer (shown in this figure by a human eye) of an entire volumetric object or scene in the reflection of the oscillating surface 18. None of this requires special viewing goggles or VR headsets. Furthermore, none of this involves viewer head/eye tracking. In this way, the virtual reflective 3D volumetric display device allows any viewer to experience the full 3D volume and parallax effect from any of multiple viewing positions.

Figure 4:
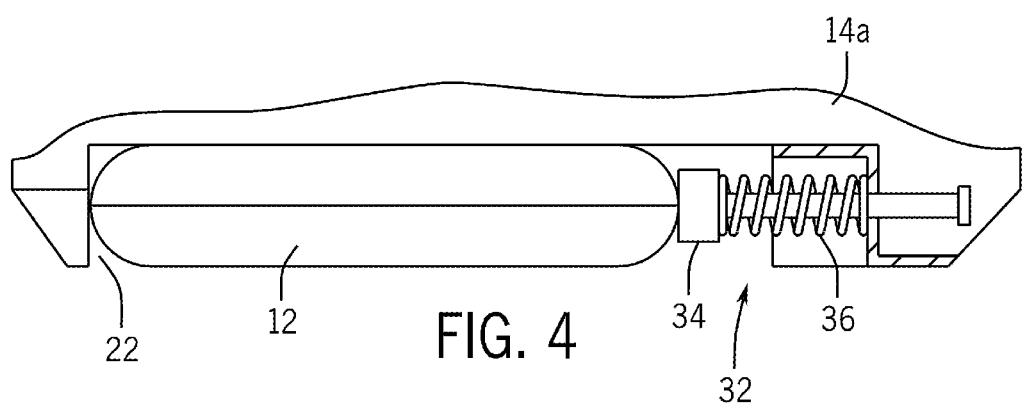
FIG. 4 conceptually illustrates a detailed view along line 4-4 in FIG. 3 of an opening for a digital device to use in connection with the virtual reflective 3D volumetric display device in some embodiments.

Additionally, the flat-screen display never moves—only the oscillating surface 18 that moves through the total angular distance (i.e., 45°) is needed to "draw out" the scene or object. By way of example, FIG. 4 conceptually illustrates a detailed view along line 4-4 in FIG. 3 of are near the digital device opening 22 in the base 14a of the virtual reflective 3D volumetric display device 10. Specifically, the detailed view shows an adjustable clamping device 32, a contact pad 34, and a compression spring 36, which together allow the digital device 12 to be securely aligned within the digital device opening 22 of the base 14a of the virtual reflective 3D volumetric display device 10. As an example, cell phone or smart phone device users will connect to the virtual reflective 3D volumetric display device by sliding or snapping their cell phones/smart phones into the digital device opening 22 at the bottom of the base 14a of the housing 14 of the virtual reflective 3D volumetric display device 10. In some embodiments, the mini-USB cord of the virtual reflective 3D volumetric display device 10 mini USB cord is extendable to allow connection with various size mobile phones.

II. Creating Virtual Reflective 3D Volumetric Imagery Method

Some embodiments include a method for creating virtual reflective 3D volumetric imagery. In some embodiments, the method for creating virtual reflective 3D volumetric imagery comprises importing a 3D object into a slicer software application, using the slicer software application to create a plurality of sequential 2D cross-section bitmap images from the 3D object, transmitting the plurality of sequential 2D cross-section bitmap images to a virtual reflective 3D volumetric display device, synchronizing the plurality of sequential 2D cross-section bitmap images with an oscillating reflected surface of the virtual reflective 3D volumetric display device, and visually outputting a virtual 3D volumetric image of the 3D object while a motor and an optical encoder maintains synchronization of the oscillating reflected surface with the corresponding 2D cross-section bitmap images. In some embodiments, the plurality of sequential 2D cross-section bitmap images from the 3D object comprise at least one hundred sequential 2D cross-section bitmap images.

Figure 5:
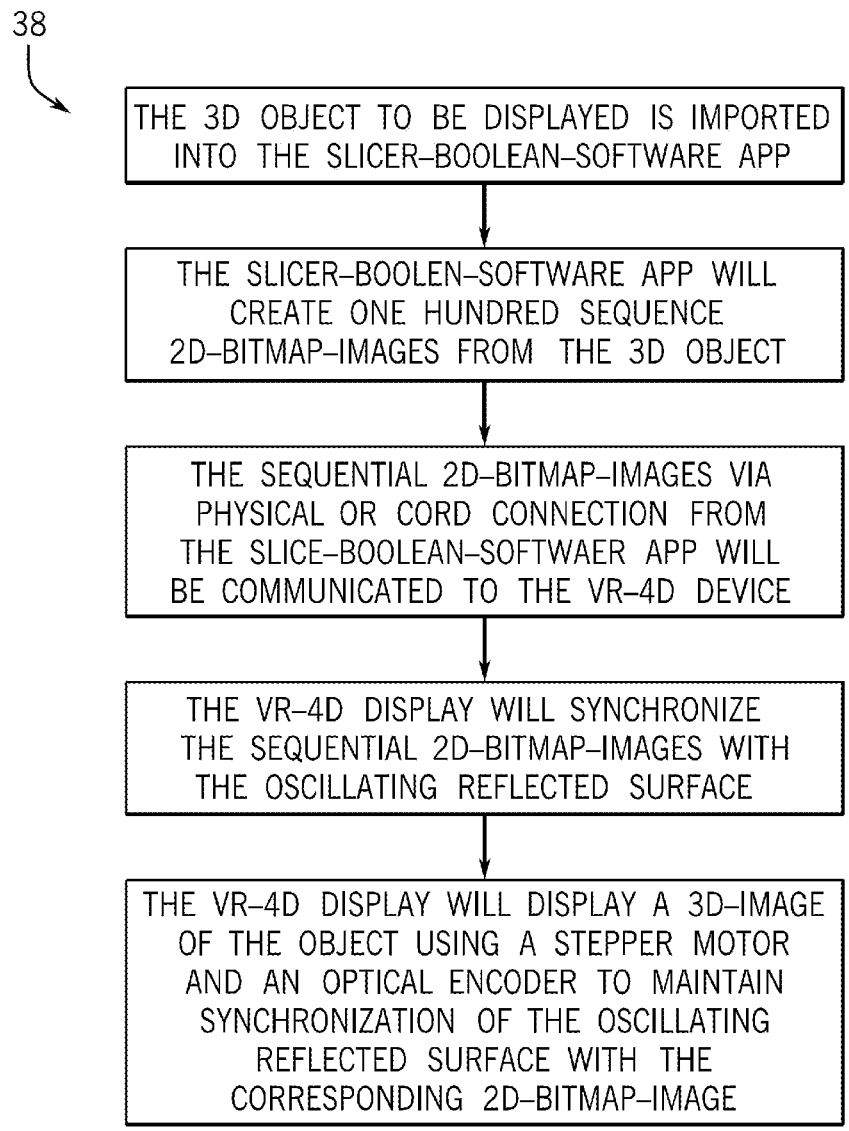
FIG. 5 conceptually illustrates a process for creating virtual reflective 3D volumetric imagery in some embodiments.

By way of example, FIG. 5 conceptually illustrates a process for creating virtual reflective 3D volumetric imagery 38. As shown, the process 38 starts by importing a volumetric 3D object into a slicer application. One way to capture and display a volumetric 3D object with the virtual reflective 3D volumetric display device is by importing a 3D object file (an "OBJ" file) into the slicer software application.

The slicer software radially slices the OBJ file into multiple sequenced 2D-Bitmap-images placed inside a 3D volume container. As shown in FIG. 5, the process for creating virtual reflective 3D volumetric imagery 38 continues to the next step at which the slicer software radially slices the OBJ file into a hundred sequenced 2D-Bitmap images. The Bitmaps are flat image representations of 2D-cross-sections from original 3D objects or scenes.

Next, the process for creating virtual reflective 3D volumetric imagery 38 continues to the next step during which the slicer software application connects with the virtual reflective 3D volumetric display device 10 to export the sequenced 2D-Bitmap images and/or allow real-time feeds or interactions. In some embodiments, the slicer software application is installed on the digital device 12. In some embodiments, the slicer software application is a cloud-based software service which the digital device 12 connects to at runtime. In some embodiments, the digital device 12 connects to the virtual reflective 3D volumetric display device 10 via USB/MINI USB connection.

In some embodiments, the oscillating surface 18 of the virtual reflective 3D volumetric display device 10 is a mirror or another type of flat transparent/opaque reflected surface that oscillates forty-five degrees (45°) back and forth. The oscillating surface 18 reflects the screen of the digital device 12 (i.e., the user's phone LCD display). Once the digital device 12 is attached via USB, the slicer software application communicates with the virtual reflective 3D volumetric display device 10, sending Sequence-Bitmap-Position and Angle data to the virtual reflective 3D volumetric display device 10 for synchronization. Thus, the process for creating virtual reflective 3D volumetric imagery 38 continues to the next step during which the output of the virtual reflective 3D volumetric display device 10 is based on precise synchronization of the oscillating movement of the oscillating surface 18 with the display of the multiple sequential 2D-Bitmap images on the screen of the digital device 12.

In some embodiments, a stepper motor 24 and optical encoder 26 is used to synchronize the reflected oscillating surface 18, to ensure the oscillation moves in step with the display of the 2D sequenced images. This assures that the correct Bitmap-Slice-image is been displayed on the phone LCD or MICRO-LED screen to match the original slices at its original angle and position. In this way, the process for creating virtual reflective 3D volumetric imagery 38 continues to the next step of displaying the 3D image of the object.

The task of the oscillating surface 18 is to reflect the sequence Bitmap-slices-images from the flat screen of the digital device 12 to the viewer. As the reflective oscillating surface 18 oscillates forty-five degrees (45°) at a given speed, the reflection also oscillates what is presently been reflected. Although the reflective oscillating surface 18 is oscillating at forty-five degrees (45°), the reflection itself covers doubles the volume area and provides ninety degrees (90°) of volume area according to the physical properties and laws of reflection. With the digital device 12 screen and oscillating reflective surface 18 synchronized, the reflection of the digital device 12 screen is able to draw out each bitmap slice in sequence at a given speed.

In addition to the physical properties and laws of reflection, human viewer capacities play into the seamless construction of the 3D image of the object. Specifically, at the time of visual perception by a viewer, Persistence-of-Vision takes effect allowing the viewer to see all cross-sections of the entire object or scene at once when looking into the reflection of the surface 18. The screen of the digital device 12 itself stays stationary—only the reflection of the screen in the surface 18 moves, making this a virtual reflective 3D volumetric device.

III. Creating a Virtual Reflective 3D Volumetric Object

To use the virtual reflective 3D volumetric display device of the present disclosure, the viewer gets to view 3D objects and scenes with full depth and parallax from all angles without any head tracking or wearing head gear like virtual reality (VR) goggles or other such VR eye-wear. Unlike VR eye-wear, if the observer has only one eye, they will still get the 3D volumetric experience although its virtually in the reflective surface, it take up true space like looking into a window. Although VR is immersive, a person with one eye will not experience it as intended because VR is displayed on a 2D screen, making it difficult with single-eye vision to conceptualize in more than two spatial dimensions. Beyond these technical considerations, it is typically uncommon for every person to feel comfortable adopting new technology that requires an adjustment of the body and self. In particular, VR goggles or VR eye-wear is often too much gear for some people, e.g., an elder person who does not want to wear head gear.

Figure 6:
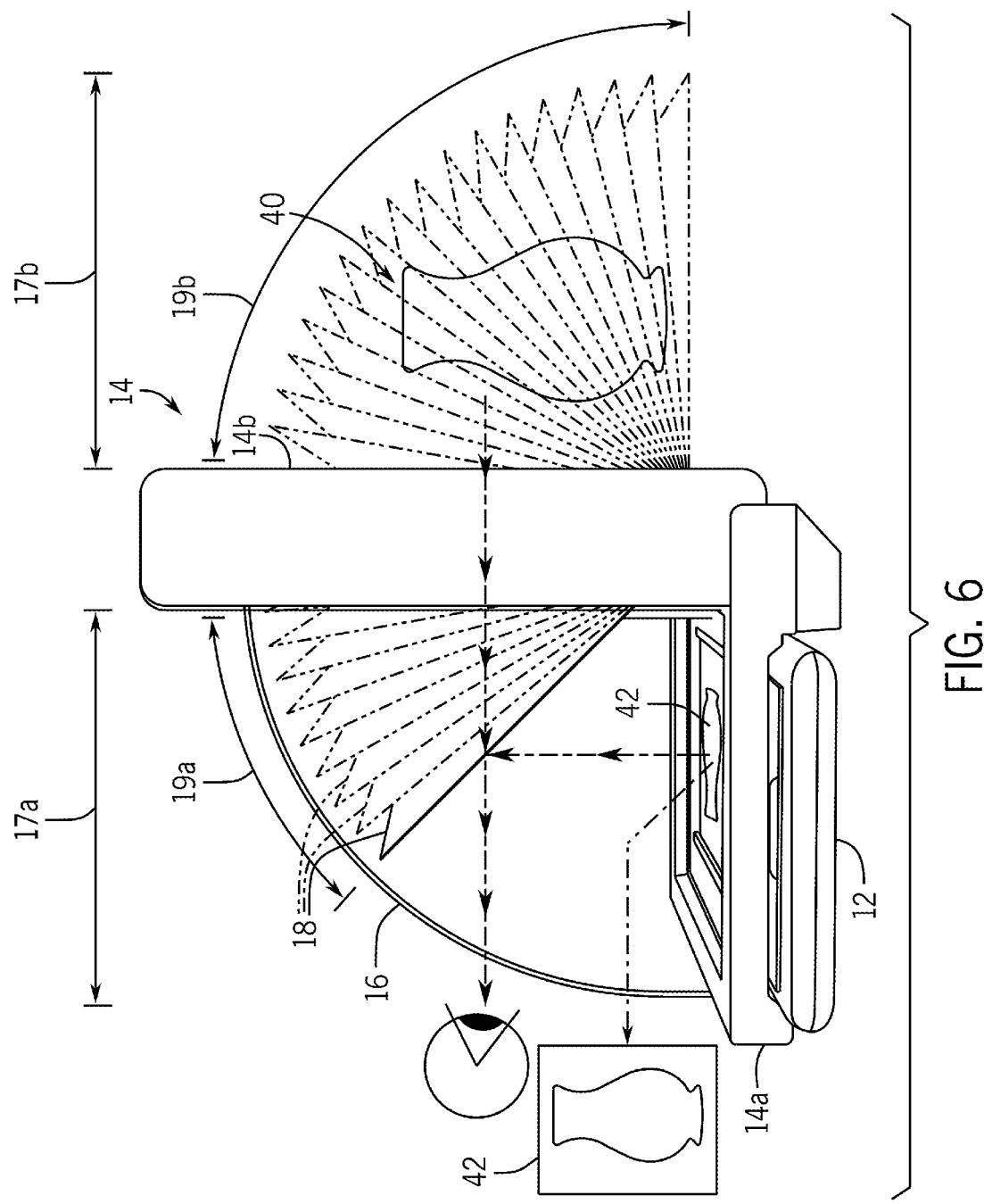
FIG. 6 conceptually illustrates the virtual reflective 3D volumetric display device during being used to generate a virtual 3D volumetric object image in some embodiments.

By way of example, FIG. 6 conceptually illustrates the virtual reflective 3D volumetric display device being used to generate a virtual 3D volumetric object image. Specifically, as shown in this figure, the virtual reflective 3D volumetric display device is being used in connection with a digital device 12 (shown in connection at the housing base 14a) which displays multiple image slices in sequence of an object. An example 2D slice image 42 is shown to be visually output onto the screen of the digital device 12, such that the oscillating surface 18 reflects the image through the transparent cover 16 to an observer. As the sequence of 2D slice images are visually output onto the screen of the digital device 12, the oscillating surface 18 moves in synchronicity over a forty-five degree (45°) total angular distance 19a all the way up to the vertical portion 14b of the housing 14. A physical width 17a corresponds to a virtual reflected width 17b, and is shown in this figure to conceptually represent a viewer perceived volumetric 3D appear object 40 over a virtual ninety degree (90°) sweep (i.e., a sweep that is double the angular distance of the total angular distance of the oscillating surface 18), as shown by the ninety degree (90°) oscillating reflection 19b.

Figure 7:
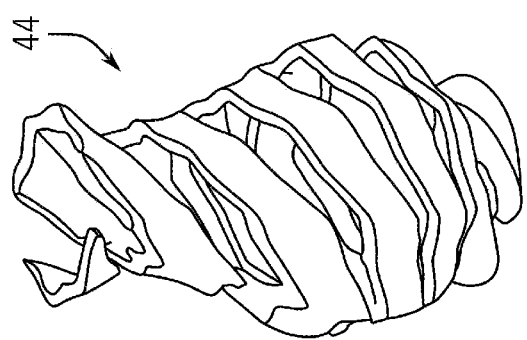
FIG. 7 conceptually illustrates a perspective view of a cross-sectional object reconstruction by the virtual reflective 3D volumetric display device in some embodiments.

By way of another example in connection with this figure, FIG. 7 conceptually illustrates a detailed cross-sectional sliced object reconstruction 44 by the virtual reflective 3D volumetric display device.

As shown in FIGS. 6 and 7, the volumetric 3D appear object 40 appears via reflection from the oscillating surface 18, resulting in the volumetric appearing cross-sectional sliced object reconstruction 44 which many different viewers can perceive from any of several different locations and from different viewing angles, all of which provide the sense of the volumetric appearing cross-sectional sliced object reconstruction 44 on display in an angular viewing space of ninety degrees (i.e., 90°). Also, a parallax effect is observable to any viewer who moves around while viewing the volumetric appearing cross-sectional sliced object reconstruction 44. These effects and the appearance of volume occur because objects and scenes that appear via the reflective oscillating surface 18 are "drawn out" in a viewing space that appears to a viewer to be double the total angular distance. In FIG. 6, for example, the total angular distance 19a of the oscillating surface 18 is forty-five degree (45°) which results in the ninety degree (90°) oscillating reflection 19b as the perceived angular viewing space to the observer. In this way, viewing the object that is "drawn out" in the reflective oscillating surface 18 is like looking into a window with an actual object having physical volume. None of this requires special viewing goggles or VR headsets. Also, none of this involves viewer head/eye tracking. In this way, the virtual reflective 3D volumetric display device allows any viewer to experience the full 3D volume and parallax effect from any of multiple viewing positions.

To make the virtual reflective 3D volumetric display device of the present disclosure, a person can design and 3D print the housing in an L-shape where the base meets the vertical portion, add a motor, such as a stepper-motor, and provide a thin flat mirror or reflective flat surface material, which is connected at the bottom to a shaft of via a 3D printed extruded tube. The opposite end of the extruded tube is sandwiched with the optical encoder facing and connected in-sync with the stepper motor. Using an optical encoder ensures that the oscillating surface (or mirror) is at its correct angle as slice-images are being distributed. With the oscillating surface (mirror) connected to at the bottom, the oscillating surface (mirror) will tilt forward towards the base of the housing L-shape, such that a position at 90 degrees is its starting zero point. The oscillating surface (mirror) will oscillate back and forth +45 degrees and −45 degrees between position 90 and 45 degree.

Other internal components can be incorporated, such as the internal controller 28. Also, a person can replace the stepper motor with another type of motor to provide the synchronized oscillating movement of the reflective oscillating surface. In some embodiments, the internal controller 28 is a micro-controller (MC) or processor (CPU) connected to a motherboard. In some embodiments, the internal controller 28 (or rather, the MC) is located at the back of the vertical portion 14b of the housing 14. The job of the internal controller 28 (MC) is to import Bitmap images from the digital device 12 or a controller and memory of the flat-surface display (or other standalone display). Another job of the internal controller 28 (MC) is to initialize oscillation synchronization. To do so, the internal controller 28 (MC) reads angle data, reads the current position of the stepper motor 24 and sets it to zero point, and begins oscillation. In some embodiments, the internal controller 28 (MC) receives feedback from optical encoder 26 to enable a continuous close-loop operation.

In some embodiments, the housing base 14a includes a rectangular cut-out window for the digital device of the user (e.g., the user's cellphone or smartphone). The rectangular cut-out can be formed in two parts on tracks to allow for size adjustment for different phones dimension. Using springs and clamps will secure that the phone stays in place.

In some embodiments, a mobile app created by a programmer is used. The mobile app is a slicer program. An example of such a slicer program is "Boolean-Slicer-VR", but a person skilled in the relevant art would appreciate that there are many options to use for a slicer program. The function of this program is to work as a plugin and middleman to extract 2D-Sliced-images and angle data from various existing media (e.g., a 3D image file, with a set of sequenced 2D slice images of an object represented as a 3D object). This will enable users to stream or download 3D files from the web or use local 3D scan data from their digital device (e.g., smartphone, tablet computing device, etc.). The virtual reflective 3D volumetric display device also has onboard hardware and software that is able to communicate between various 3D scanners (e.g., the SENSE scanner) for real-time volumetric capturing and communication.

Any flat reflecting oscillating surface in-sync together with any flat display that is displaying flat-2D-slices of a scene or object. A high speed, as denoted by frames-per-second ("FPS"), allows the virtual reflective 3D volumetric display device to sufficiently enable persistence-of-vision for the viewer to see an entire scene or an entire object via multiple successive flat cross-sections. Presently, DMD projectors and micro LED technology offers excellent results because both produce high FPS video or output of multiple sequenced 2D slice images to synchronize with the oscillating reflective surface. A lidar type infra red laser can be use to be in sync with reflecting surface to capture object, people or scene that is in a line-of-sight with the virtual reflective 3D volumetric display device.

In some embodiments, a mechanical version of the virtual reflective 3D volumetric display device is supported by using a film projector. Specifically, from beneath the base, one could use an LED strobe light and lenses to simulate a movie projector with images of 2D slices on film that project onto a translucent surface from beneath and are reflected by a flat oscillating reflected surface. The translucent surface is a flat, stationary translucent surface, while the reflected surface is a flat oscillating surface that is reflective. Thus, when the 2D slices are projected onto the flat translucent surface from beneath, the 2D slices are reflected by the oscillating surface. The reflected oscillating surface, film, and LED strobe light are synchronized together using an optical trigger or another precision mechanism. Using gears and an oscillating arm allows the film wheel to rotate continually while the arm mechanically oscillates the reflective surface forty-five degrees (45°) back and forth.

IV. Electronic System

Many of the above-described features and applications are implemented as software processes that are specified as a set of instructions recorded on a computer readable storage medium (also referred to as computer readable medium). The computer readable media does not include carrier waves and electronic signals passing wirelessly or over wired connections. However, when these instructions are executed by one or more processing unit(s) (e.g., one or more processors, cores of processors, micro-controllers, or other processing units), they cause the processing unit(s) to perform the actions indicated in the instructions. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, other optical or magnetic media, and floppy disks.

In this specification, the terms "software", "application", "app", and "mobile app" (referred to below as "software") are meant to include firmware residing in read-only memory or applications stored in magnetic storage, which can be read into memory for processing by a processor, such as the processor of a mobile computing device or a mobile communication device, such as a smartphone, a hand-held computing device, or a tablet computing device (referred to simply as a "mobile device"), or the processor of a traditional computing device, such as a server computer, a desktop computer, or a laptop computer (referred to simply as a "computer"). Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that perform the operations of the software programs. Programmable processors, micro-controllers, and computers can be packaged or included in mobile devices or in custom hardware including the virtual reflective 3D volumetric display device. The processes may be performed by programmable processors or micro-controllers and by one or more set of programmable logic circuitry. General and special purpose computing and storage devices can be interconnected through communication networks.

Figure 8:
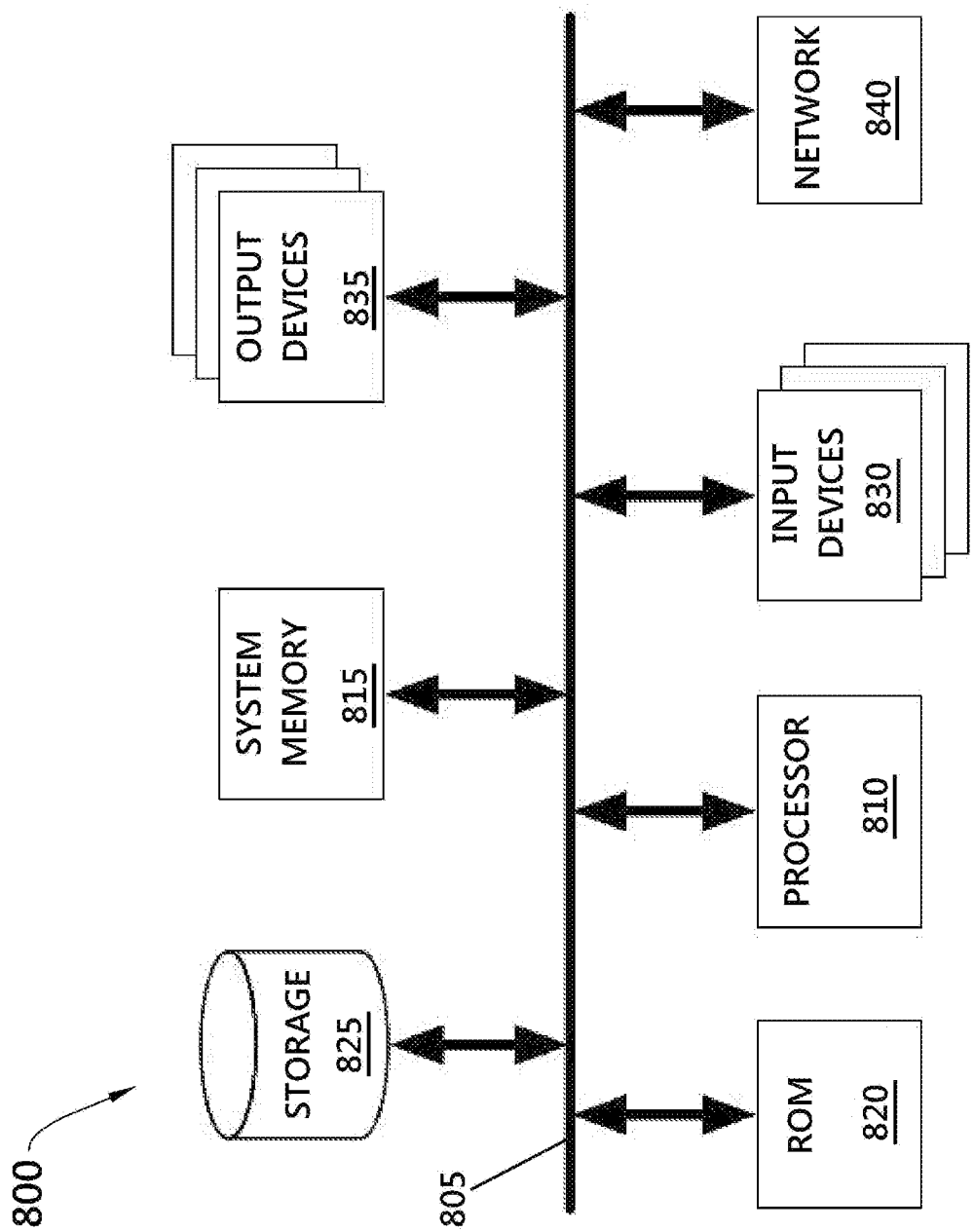
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer, mobile device, tablet, phone, PDA, or any other sort of electronic device. Such an electronic system includes various types of computer readable media and interfaces for various other types of computer readable media. Electronic system 800 includes a bus 805, processing unit(s) 810, a system memory 815, a read-only 820, a permanent storage device 825, input devices 830, output devices 835, and a network 840.

The bus 805 collectively represents all system, peripheral, and chipset buses that communicatively connect the numerous internal devices of the electronic system 800. For instance, the bus 805 communicatively connects the processing unit(s) 810 with the read-only 820, the system memory 815, and the permanent storage device 825.

From these various memory units, the processing unit(s) 810 retrieves instructions to execute and data to process in order to execute the processes of the invention. The processing unit(s) may be a single processor or a multi-core processor in different embodiments.

The read-only-memory (ROM) 820 stores static data and instructions that are needed by the processing unit(s) 810 and other modules of the electronic system. The permanent storage device 825, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 825.

Other embodiments use a removable storage device (such as a floppy disk or a flash drive) as the permanent storage device 825. Like the permanent storage device 825, the system memory 815 is a read-and-write memory device. However, unlike storage device 825, the system memory 815 is a volatile read-and-write memory, such as a random access memory. The system memory 815 stores some of the instructions and data that the processor needs at runtime. In some embodiments, the invention's processes are stored in the system memory 815, the permanent storage device 825, and/or the read-only 820. For example, the various memory units include instructions for processing appearance alterations of displayable characters in some embodiments. From these memory units, the processing unit(s) 810 retrieves instructions to execute and data to process in order to execute the processes of some embodiments.

The bus 805 also connects to the input and output devices 830 and 835. The input devices enable the user to communicate information and select commands to the electronic system. The input devices 830 include alphanumeric keyboards and pointing devices (also called "cursor control devices"). The output devices 835 display images generated by the electronic system 800. The output devices 835 include printers and display devices, such as cathode ray tubes (CRT) or liquid crystal displays (LCD). Some embodiments include devices such as a touchscreen that functions as both input and output devices.

Finally, as shown in FIG. 8, bus 805 also couples electronic system 800 to a network 840 through a network adapter (not shown). In this manner, the computer can be a part of a network of computers (such as a local area network ("LAN"), a wide area network ("WAN"), or an intranet), or a network of networks (such as the Internet). Any or all components of electronic system 800 may be used in conjunction with the invention.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A virtual reflective three-dimension (3D) volumetric display device that displays a volumetric 3D object to a viewer, said virtual reflective 3D volumetric display device comprising:

a housing comprising a base housing portion and a vertical housing portion, wherein the base housing portion comprises a digital device opening and a cut-out section;

a digital device with a flat display onto which a plurality of sequenced 2D slice images associated with a 3D base object are visually output, wherein the digital device is configured to slide into the digital device opening of the base housing portion, wherein the flat display of the digital device is aligned with the cut-out section when the digital device is slid into the digital device opening;

a reflective oscillating surface connected to the housing at a bottom of the vertical housing portion, said reflective oscillating surface configured to oscillate over a total angular distance to reflect the plurality of 2D slice images;

a stepper motor that moves the reflective oscillating surface over the total angular distance; and an internal micro-controller that is configured to control the stepper motor based on a number of 2D images in the plurality of 2D slice images and a time duration over which the plurality of 2D slice images are visually output onto the flat display of the digital device.

2. The virtual reflective 3D volumetric display device of claim 1, wherein the vertical housing portion forms a perpendicular connection to the base housing portion.

3. The virtual reflective 3D volumetric display device of claim 1, wherein the internal micro-controller calculates a rate of oscillation speed that is synchronized with a rate of display in which the plurality of 2D slice images are visually output onto the flat display.

4. The virtual reflective 3D volumetric display device of claim 3, wherein the stepper motor moves the reflective oscillating surface with the plurality of 2D slice images visually output onto the flat display based on the calculation of the rate of oscillation speed.

5. The virtual reflective 3D volumetric display device of claim 4 further comprising an optical encoder that ensures the angle of the reflective oscillating surface corresponds to a synchronized angular position determined by the internal micro-controller.

6. The virtual reflective 3D volumetric display device of claim 5, wherein the total angular distance is forty-five degrees, wherein a ninety degree angular viewing space with a virtual 3D volumetric object of the 3D base object is perceptible to a viewer when the reflective oscillating surface oscillates over forty-five degrees in synchronization with the plurality of 2D slice images visually output onto the flat display.

* * * * *